J. OSTRANDER.
MACHINE FOR ROLLING HOLLOW BARS FOR NUTS.

No. 113,332. Patented Apr. 4, 1871.

Witnesses:
John Becker
Wm. H. C. Smith

Inventor:
J. Ostrander
per Munn & Co.
Attorneys.

2 Sheets—Sheet 2.
J. OSTRANDER.
MACHINE FOR ROLLING HOLLOW BARS FOR NUTS.
No. 113,332. Patented Apr. 4, 1871.
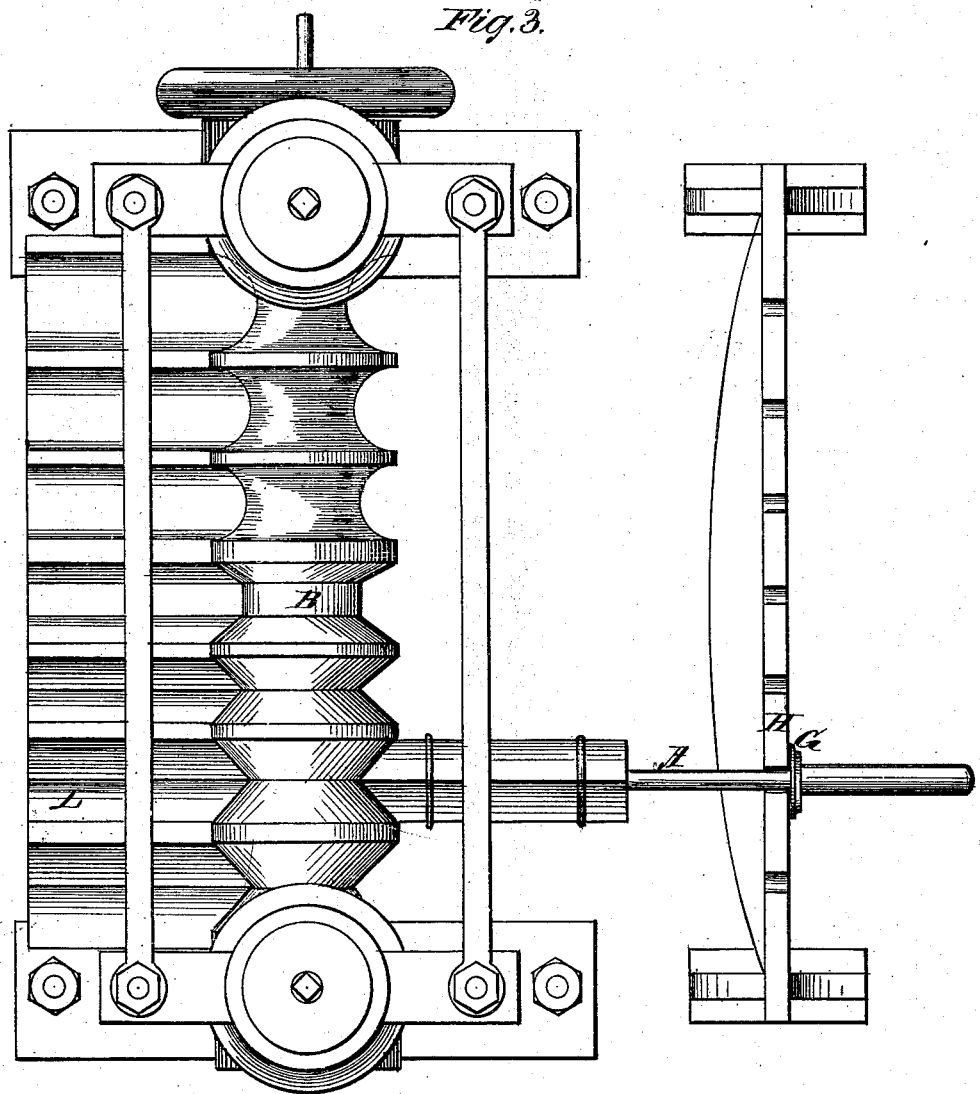
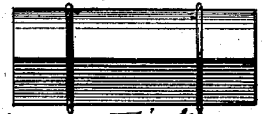 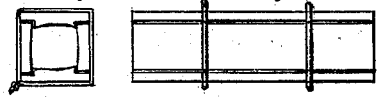
  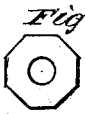  
Witnesses:
John Becker,
Wm. H. C. Smith.
Inventor:
J. Ostrander.
per
Attorneys.

United States Patent Office.

JONATHAN OSTRANDER, OF MANCHESTER, VIRGINIA.

Letters Patent No. 113,332, dated April 4, 1871.

IMPROVEMENT IN MACHINES FOR ROLLING HOLLOW BARS FOR NUTS.

The Schedule referred to in these Letters Patent and making part of the same.

*To all whom it may concern:*

Be it known that I, JONATHAN OSTRANDER, of Manchester, in the county of Chesterfield and State of Virginia, have invented a new and useful Improvement in Machines for the Manufacture of Hollow Bars for Nuts; and I do hereby declare that the following is a full, clear, and exact description thereof, which will enable others skilled in the art to make and use the same, reference being had to the accompanying drawing forming part of this specification.

This invention relates to improvements in machines for manufacturing hollow bars for blanks, from which to form nuts for screwing upon bolts; and It consists in a grooved and vertically-adjustable table, arranged on the discharging side of the rolls, to receive the bars or tubes and prevent their turning or losing their proper shape, and in a rest-bar for the "scalp," and former or mandrel, made similarly adjustable on the opposite side of the rolls.

Figure 3 is a plan view of the same.

Figure 1:
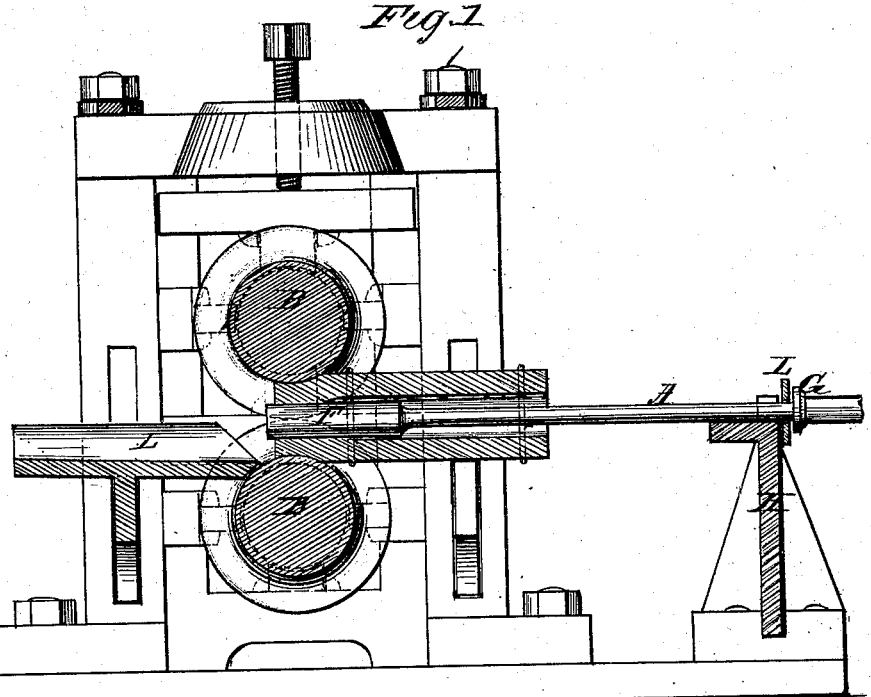
Figure 1 is a transverse section of a machine containing my improvements, a tube being represented as passing between the rolls.
Figure 2:
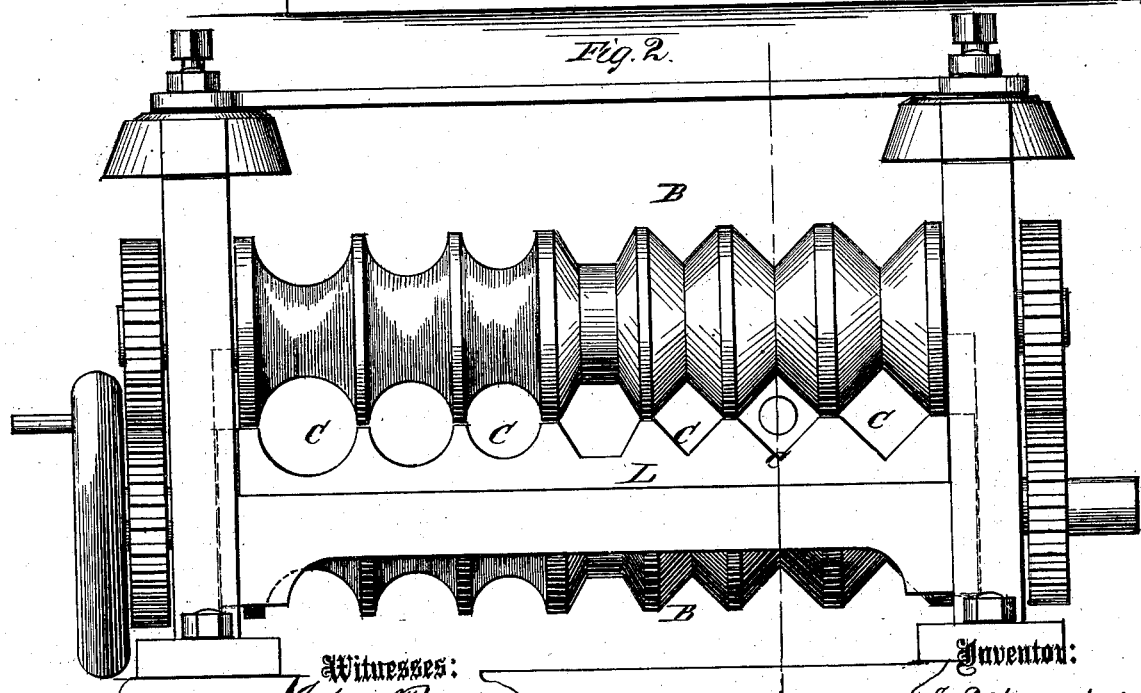
Figure 2 is a side elevation.

Figures 5 to 9, inclusive, represent different views of fagots of which bars of different forms are made by proper manipulation in my improved machine.

Figures 10 to 12, inclusive, represent end views of bars of different forms, as finished in my machine and ready to be cut into nut-blanks.

B indicates rolls, which are made vertically-adjustable by screws, and have a series of square, round, or other-shaped grooves, C, for gradually reducing the fagot, by aid of the former A, to the required size or form, and welding the pieces of scalp together.

These pieces may be formed in the muck or puddle-rolls from scrap, pig, or old railroad iron, in two, three, or more sections adapted for making the fagot by tying together, as represented in figs. 5 to 9, and suited for the shaped or finished nut-blank.

The former A has a collar, G, for holding it in connection with the notched bar H, and is made largest at the point F. The bar thus formed is then sawn into nuts of the required thickness by a gang of saws.

A former, A, made larger at the point F, is employed, and on it the metal is rolled.

The former has a collar, G, for holding it against a notched bar H.

L represents a grooved table having grooves corresponding in form to those of the rolls, arranged on the discharging side of the rolls to receive the bars in the process of rolling, and hold them against bending downward or sidewise; also for taking up to hand back to the roller.

This table I arrange to be vertically-adjusted by screws, or other preferred means, its ends fitting in elongated slots or grooves in the frame or housings of the machine for that purpose.

M is a rest-bar for the scalp and former, which is on the side of the rolls opposite the table L, and is made vertically adjustable in the same way.

I do not claim the notched bar H nor the former, but

The combination, with the rolls B, of the correspondingly-grooved table L and the rest-bar M, arranged to be adjusted subtantially as herein shown and described.

JONATHAN OSTRANDER.

Witnesses:
WILLIAM H. OSTRANDER,
CHARLES E. OSTRANDER.